US011523161B2

United States Patent
Greenberg et al.

(10) Patent No.: US 11,523,161 B2
(45) Date of Patent: Dec. 6, 2022

(54) EXCITING MOMENT PRE-COGNIZANT NOTIFICATION FOR LIVE EVENTS

(71) Applicant: FAST DOG, LLC, Miami, FL (US)

(72) Inventors: Steven M. Greenberg, Boynton Beach, FL (US); Eduardo Burillo, Key Biscayne, FL (US)

(73) Assignee: Fast Dog, LLC, Miami, FL (US)

( * ) Notice: Subject to any disclaimer, the term of this patent is extended or adjusted under 35 U.S.C. 154(b) by 0 days.

(21) Appl. No.: 16/875,439

(22) Filed: May 15, 2020

(65) Prior Publication Data
US 2021/0360308 A1 Nov. 18, 2021

(51) Int. Cl.
*H04N 21/262* (2011.01)
*H04N 21/2187* (2011.01)
*H04N 21/4784* (2011.01)
*G06K 9/62* (2022.01)
*G06V 20/40* (2022.01)

(52) U.S. Cl.
CPC ..... *H04N 21/26225* (2013.01); *G06K 9/6256* (2013.01); *G06V 20/42* (2022.01); *G06V 20/48* (2022.01); *H04N 21/2187* (2013.01); *H04N 21/4784* (2013.01); *G06V 20/44* (2022.01)

(58) Field of Classification Search
CPC ......... H04N 21/26225; H04N 21/2187; H04N 21/4784; G06K 9/00724; G06K 9/00758; G06K 9/6256; G06K 2009/00738; G06V 20/42; G06V 20/44; G06V 20/48
See application file for complete search history.

(56) References Cited

U.S. PATENT DOCUMENTS

| 2008/0064490 A1* | 3/2008 | Ellis | H04N 21/44218 463/25 |
| 2013/0268620 A1* | 10/2013 | Osminer | H04N 21/251 709/217 |
| 2014/0157307 A1* | 6/2014 | Cox | H04N 21/435 725/34 |

(Continued)

OTHER PUBLICATIONS

Asra Aslam and Edward Curry, Towards a Generalized Approach for Deep Neural Network Based Event Processing for the Internet of Multimedia Things, IEEE Access, Special Section on Multimedia Analysis for Internet of Things, Apr. 5, 2018, pp. 25573-25587, vol. 6, 2018.

*Primary Examiner* — Randy A Flynn
(74) *Attorney, Agent, or Firm* — CRGO Global; Steven M. Greenberg

(57) ABSTRACT

Embodiments of the present invention provide a method, system and computer program product for exciting moment notification for a live event. An exciting moment notification method includes first defining in a table in memory of a computer, an exciting moment occurring during a live event, such as a card game, awards program or a sporting event, and then annotating a multiplicity of images of different instances of the live event with the exciting moment. The method further includes video streaming a live instance of the live event over a computer communications network and matching a frame of the video streamed live instance in the memory of the computer to an annotated one of the multiplicity of images. Finally, the method includes transmitting a message to at least one subscriber of the instance of the live event indicating an occurrence of the exciting moment.

14 Claims, 2 Drawing Sheets

(56) References Cited

U.S. PATENT DOCUMENTS

| | | | |
|---|---|---|---|
| 2016/0066042 A1* | 3/2016 | Dimov | H04N 21/44008 |
| | | | 725/34 |
| 2016/0110877 A1* | 4/2016 | Schwartz | H04N 21/84 |
| | | | 382/107 |
| 2018/0025373 A1* | 1/2018 | Perriman | G06Q 50/01 |
| | | | 705/7.11 |
| 2018/0108380 A1* | 4/2018 | Packard | H04N 21/23418 |
| 2019/0356948 A1* | 11/2019 | Stojancic | H04N 21/8549 |
| 2019/0362601 A1* | 11/2019 | Kline | G07F 17/3223 |
| 2020/0175303 A1* | 6/2020 | Bhat | H04N 21/8549 |

\* cited by examiner

EXCITING MOMENT PRE-COGNIZANT NOTIFICATION FOR LIVE EVENTS

BACKGROUND OF THE INVENTION

Field of the Invention

The present invention relates to the field of digital broadcasting and more particularly to the live streaming of an event.

Description of the Related Art

Events such as sporting events, games, awards, challenges, of chance or skill and the like are generally spectated both live and remotely through a broadcast medium. For many years, the broadcast medium had been television. But, in the age of the Internet, most competitive events subject to broadcast by way of television media, also have been broadcast by way of the Internet. Indeed, a multitude of live events now are broadcast by way of the Internet—far more than those broadcast by way of television media.

Given the availability of a vast quantity of video streams of different instances of different live events, an individual viewer must choose which video stream to watch in order to witness, in real time, an exciting moment of the live event, such as the winning play in a sporting event, or the winning move in a card game or the announcement of a winner in a competition or an award to a performer. While some enjoy multiple different video stream portals in a single computer display, only a few streams can be reasonably accommodated. As well, the mobile nature of the individual does not permit the viewing of multiple different displays of different video streams from a mobile device such as a smart phone. Of course, the simultaneous streaming of different videos to a single device can be extremely taxing on the computing resources of the device. Thus, most individuals interested in viewing multiple different instances of different live events are likely to miss witnessing in real time, corresponding exciting events.

BRIEF SUMMARY OF THE INVENTION

Embodiments of the present invention address deficiencies of the art in respect to the remote viewing of an event and provide a novel and non-obvious method, system and computer program product for exciting event notification. In an embodiment of the invention, an exciting moment notification method includes first defining in a table in memory of a computer, an exciting moment occurring during a live event such as during a game of chance, during a presentation of an award, during a sporting event or during the announcement of a victor in a competition, and then annotating a multiplicity of video or photo images of different instances of the live event as pre-cognizant of the exciting moment. The method further includes video streaming a live instance of a corresponding event over a computer communications network and matching a frame of the video streamed live instance in the memory of the computer to an annotated one of the multiplicity of images. Finally, the method includes transmitting a message to at least one subscriber of the live instance of the event indicating a likelihood of a future occurrence of the exciting moment.

In one aspect of the embodiment, the table is a convolutional deep neural network trained with the multiplicity of images each annotated as pre-cognizant of an exciting moment. In another aspect of the embodiment, the method additionally includes computing a probability of a wager resulting in a payout based upon the exciting moment and including in the message, an activatable control programmed to present a prompt in a digital or mobile device of the subscriber to purchase a full or a fractional interest in the wager based upon the computed probability. In yet another aspect of the embodiment, the method additionally includes filtering a list of subscribers with respect to the corresponding event and transmitting the message only to those of the subscribers filtered according to the corresponding event.

In another embodiment of the invention, a data processing system may be configured for exciting moment notification. The system includes a host computing platform that has at least one computer with memory and at least one processor. The system also has a video streaming engine executing in the host computing platform and capturing a live video stream from over a computer communications network of a live instance of an event. The system yet further has a table disposed in the memory of the host computing platform, that stores annotated images of different instances of the event that are pre-cognizant of an associated exciting moment. Finally, the system has an exciting moment notification module. The module includes computer program instructions that when executing by the processor of the host computing system, analyze the live video stream from the video streaming engine, match a frame of the video streamed live instance to an annotated one of the images and transmit a message over the computer communications network to at least one subscriber of the live instance of the event indicating a likelihood of a future occurrence of the exciting moment.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for exciting moment notification for an instance of a live event. In accordance with an embodiment of the invention, different video streams of different instances of contemporaneous events are received and processed with respect to a table of exciting moments. In this regard, the table of exciting moments correlates imagery with a pre-cognition of an exciting moment for a corresponding one of the instances of the live events To wit, the pre-cognition of the exciting moment is not the exciting moment itself, but imagery previously correlated with a subsequent occurrence of an exciting moment. Upon detecting imagery correlated with the pre-cognition of an exciting moment for an instance of a live event, a message is transmitted to one or more subscribers subscribed to exciting moment notifications for the instance with a link disposed in the message to a live stream server for the instance. In this way, each subscriber receiving the message can stream video of the instance prior to the occurrence of the exciting moment so as to witness the exciting moment in real time without requiring each subscriber to stream the entirety of the instance of the event and to needlessly consume computing resources and network bandwidth.

Figure 1:
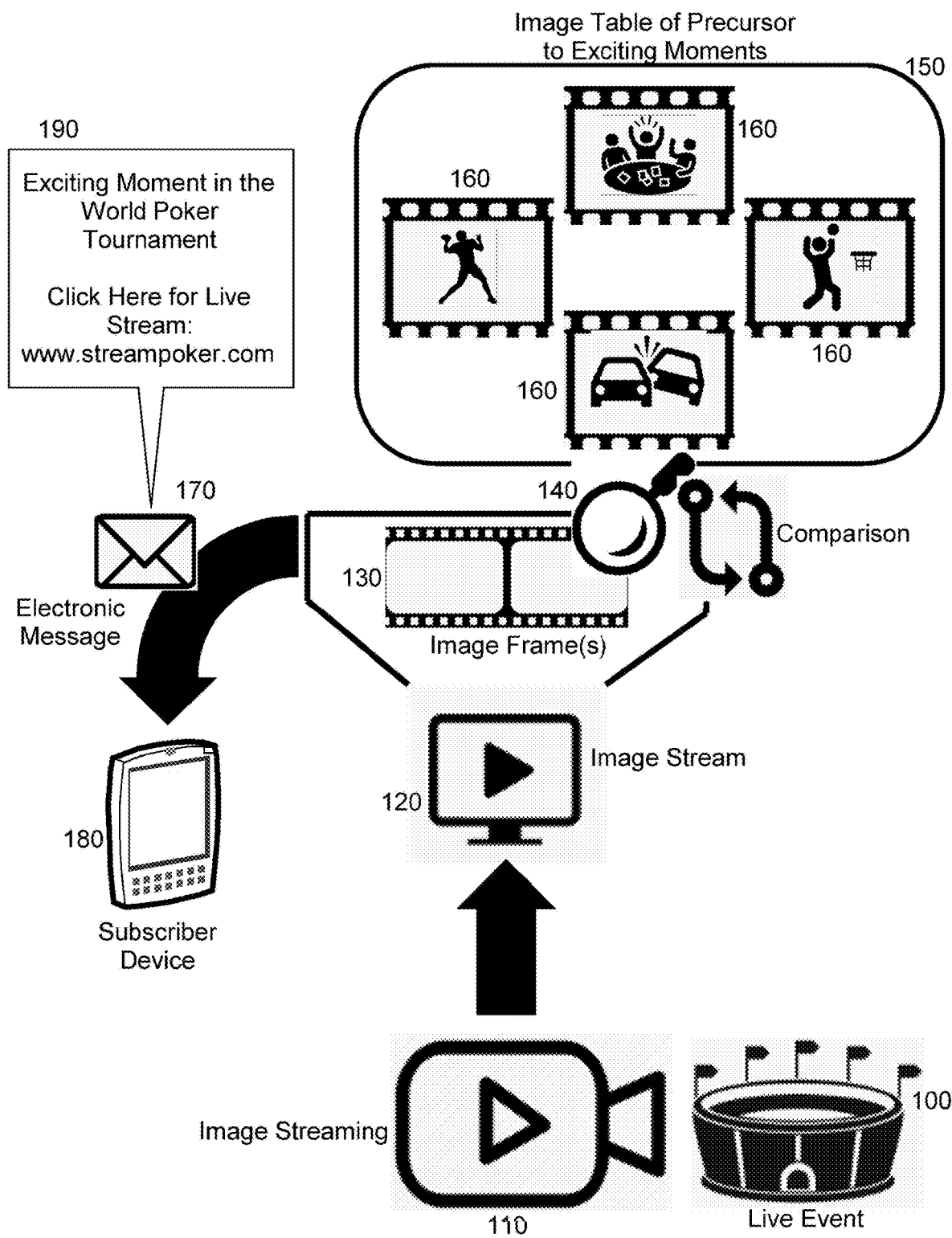
FIG. 1 is pictorial drawing of a process for exciting moment notification for an instance of a live event.

In further illustration, FIG. 1 pictorially shows a process for exciting moment notification for an instance of a live event. As shown in FIG. 1, a table 150 is established for different images 160 pre-cognizant of an exciting moment in a corresponding live event, such as a sporting event or card game, awards show or televised competition. Examples include an image of a game player in a pose pre-cognizant of an exciting moment such as a pose for shooting a ball at a target such as a goal, net or basket, a pose for passing a ball to another player, a pose for arranging to kick a ball at a target such as a field goal or soccer goal, a pose indicative of placing a large wager in a card game or a master of ceremonies opening an envelope containing the name of a victor. Other pre-cognizant imagery can include a car positioned perpendicular to an adjacent car or contacting another car on the race track perpendicularly indicating an imminent crash, or smoke emanating from the wheels of a car on a racetrack.

Thereafter, a live instance 100 of a corresponding event is filmed for live streaming 110 and the image stream 120 is received and processed. During processing, one or more image frames 130 of the image stream 120 are subjected to a comparator 140 in respect to the table 150 in order to determine if the image frames 130 include imagery that is pre-cognizant of an exciting moment for the live instance 100 of the corresponding event. If so, a network address of the live streaming 110 is embedded in an electronic message 170 such as a text message or e-mail message, along with a prompt 190 indicating the likelihood of a future occurrence of the exciting moment. The message 170 is then transmitted to the electronic device 180 of a subscriber to the live instance 100 of the corresponding event.

Figure 2:
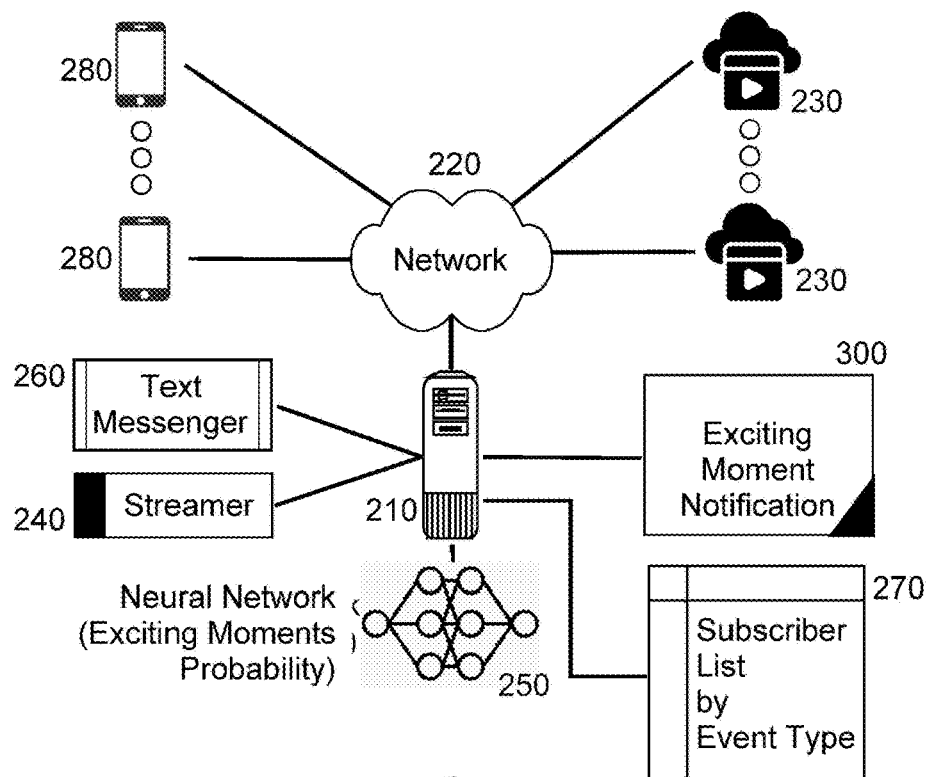
FIG. 2 is schematic illustration of a data processing system configured for exciting moment notification for an instance of a live event; and, FIG. 3 is a flow chart showing a process for exciting moment notification for an instance of a live event.

The process described in connection with FIG. 1 may be implemented in a data processing system. In further illustration, FIG. 2 schematically illustrates a data processing system configured for exciting moment notification for an instance of a live event. The system includes a host computing platform 210 that includes one or more computers, each with memory and at least one processor. A table of exciting moments is stored in the persistent memory of the host computing platform, for example, in the form a data store of exemplary images able to be processed according to content-based image comparison techniques in which a machine vision comparison of one image occurs with respect to another image in order to compute a threshold similarity. Or, as shown in FIG. 2, the table can be a convolutional neural network 250 trained with a multiplicity of images annotated as being pre-cognizant of a future occurrence of an exciting moment for a corresponding live event. The neural network 250, by way of its training, is adapted to receive an image or set of images in an image sequence of an instance of a live event and produce a probability that the image or set of images are pre-cognizant of a future occurrence of an exciting moment in the instance of the live event.

A video streaming client 240 executes in the memory of the host computing platform 210 and receives video streams of different corresponding instances of respectively different live events from associated image streaming sources 230 from over computer communications network 220. A text messenger 260 also executes in the memory of the host computing platform 210 and transmits text messages to different client computing devices 280 over the computer communications network 220. In this regard, although shown as mobile computing devices, the client computing devices 280 will be understood to include any personal computing device enabled to receive text messages. As well, it is to be understood that the text messenger 260 may be substituted for an electronic mail server, or any other programmatic logic adapted to transmit a message to a message receiving client executing in a corresponding one of the client computing devices 280.

Of note, the system includes an exciting moment notification module 300. The module 300 includes computer program instructions that when executed by a processor in the host computing platform 210, analyze received frames of imagery from the image streams received from the different image streaming sources 230. In particular, the program instructions submit the received frames to the neural network 250 in order to detect a threshold probability that one or more of the frames are pre-cognizant of an exciting moment. For each frame or frames determined by the neural network 250 to be pre-cognizant of an exciting moment for a corresponding instance of a live event, the program instructions apply to a list of subscribers 270 a filter for the corresponding instance of the live event and direct the text messenger 260 to transmit a message to the client computing devices 280 of the filtered set of subscribers indicating a likelihood of a future occurrence of an exciting moment along with a hyperlink to an associated one of the image streaming sources 230 for the corresponding instance of the live event.

Figure 3:
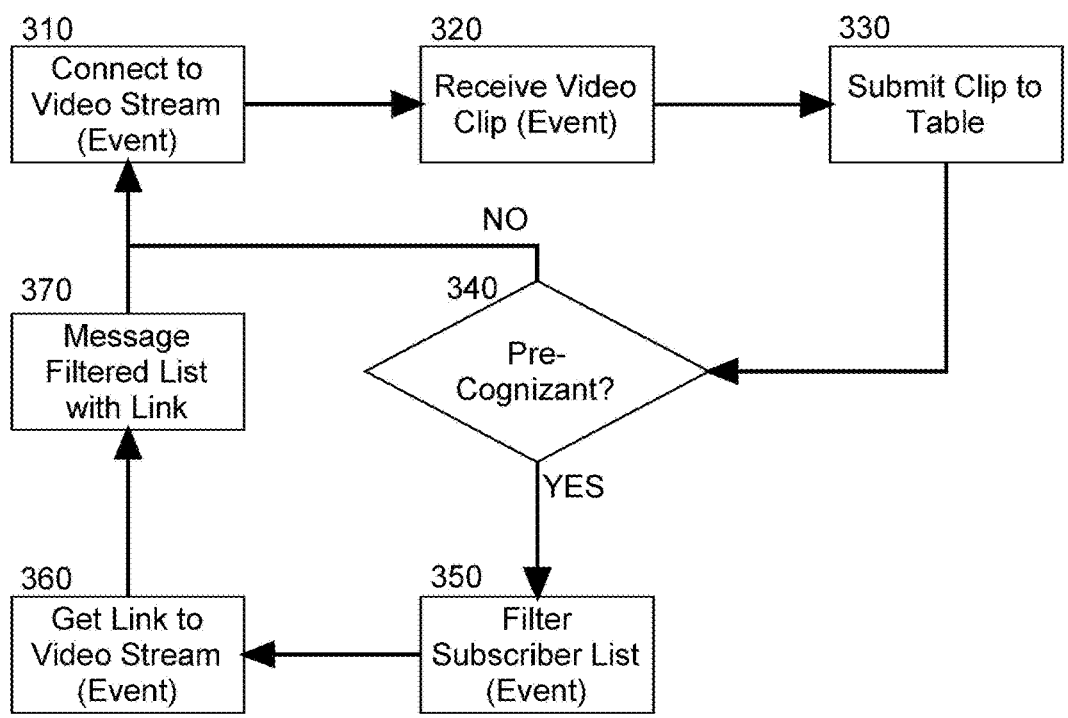

In even further illustration of the operation of the exciting moment notification module 300, FIG. 3 is a flow chart showing a process for exciting moment notification for an instance of a live event. Beginning in block 310, a communicative connection is established with a video stream for a corresponding instance of a live event. In block 320, a video clip is extracted from the video stream. In block 330, the video clip is submitted to the table of exciting moments in order to determine if the video clip is pre-cognizant of a future occurrence of an exciting moment for the corresponding instance of the live event. In decision block 340, if the video clip is determined to demonstrate a threshold probability of being pre-cognizant of an exciting moment, in block 350, a subscriber list for all instances of the games of change is filtered to include only those subscribers subscribed to instances of the corresponding live event. Then, in block 360 a network address of the video stream is retrieved and inserted into a message such as an e-mail or text message. Finally, in block 370, the message is broadcast to the filtered set of subscribers and the process repeats in block 310 for another video stream or for the same video stream. Indeed, in block 310, multiple different connections to multiple different video streams may be established in parallel and subjected to the process steps of blocks 320 through 370.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for exciting moment notification comprising:
    defining in a table in memory of a computer, an exciting moment occurring during a live event, the table comprising a convolutional deep neural network trained with the multiplicity of images each annotated as pre-cognizant of the exciting moment;
    annotating a multiplicity of images of different instances of the live event as pre-cognizant of the exciting moment, the images pre-cognitively reflecting during the live event a moment in time occurring prior to an occurrence of the exciting moment;
    video streaming a live instance of a corresponding live event over a computer communications network;
    matching a frame of the video streamed live instance in the memory of the computer to an annotated one of the multiplicity of images;
    responsive to the matching of the frame to the annotated one of the multiplicity of the images, transmitting a message to at least one subscriber of the live instance of the corresponding live event indicating a likelihood of an impending future occurrence of the exciting moment which has not yet occurred at a time of transmitting the message and embedding in the message a hyperlink with a network address of the video streaming that responsive to an activation of the hyperlink causes a display of the video streaming; and, computing a probability of a wager resulting in a payout based upon the exciting moment; and, including in the message, an activatable control programmed to present a prompt in a mobile device of the subscriber to purchase a fractional interest in the wager.

2. The method of claim 1, wherein the corresponding live event is a card game.

3. The method of claim 1, wherein the corresponding live event is a sporting event.

4. The method of claim 1, wherein the corresponding live event is an awards program.

5. The method of claim 1, further comprising:
filtering a list of subscribers with respect to the corresponding live event; and,
transmitting the message only to those of the subscribers filtered according to the corresponding live event.

6. A data processing system configured for exciting moment notification, the system comprising:
a host computing platform comprising at least one computer and at least one processor with memory;
a video streaming engine executing in the host computing platform and capturing a live video stream from over a computer communications network of a live instance of a corresponding live event;
a table disposed in the memory of the host computing platform, the table storing annotated images of different instances of the live event that are pre-cognizant of an associated exciting moment, the images pre-cognitively reflecting during the live event a moment in time occurring prior to an occurrence of the exciting moment, the table comprising a convolutional deep neural network trained with the multiplicity of images each annotated as pre-cognizant of the exciting moment; and,
an exciting moment notification module, the module comprising computer program instructions that when executing by the processor of the host computing system, perform:
analyzing the live video stream from the video streaming engine;
matching a frame of the video streamed live instance to an annotated one of the images;
responsive to the matching of the frame to the annotated one of the multiplicity of the images, transmitting a message over the computer communications network to at least one subscriber of the live instance of the corresponding live event indicating a likelihood of an impending future occurrence of the exciting moment which has not yet occurred at a time of transmitting the message and embedding in the message a hyperlink with a network address of the video streaming that responsive to an activation of the hyperlink causes a display of the video streaming; and,
computing a probability of a wager resulting in a payout based upon the exciting moment; and,
including in the message, an activatable control programmed to present a prompt in a mobile device of the subscriber to purchase a fractional interest in the wager.

7. The system of claim 6, wherein the corresponding live event is a card game.

8. The system of claim 6, wherein the corresponding live event is a sporting event.

9. The system of claim 6, wherein the program instructions further perform:
filtering a list of subscribers with respect to the corresponding live event; and,
transmitting the message only to those of the subscribers filtered according to the corresponding live event.

10. A computer program product for exciting moment notification, the computer program product including a non-transitory computer readable storage medium having program instructions embodied therewith, the program instructions executable by a device to cause the device to perform a method including:
defining in a table in memory of a computer, an exciting moment occurring during a live event defining in a table in memory of a computer, an exciting moment occurring during a live event, the table comprising a convolutional deep neural network trained with the multiplicity of images each annotated as pre-cognizant of the exciting moment;
annotating a multiplicity of images of different instances of the live event as pre-cognizant of the exciting moment, the images pre-cognitively reflecting during the live event a moment in time occurring prior to an occurrence of the exciting moment;
video streaming a live instance of a corresponding live event over a computer communications network;
matching a frame of the video streamed live instance in the memory of the computer to an annotated one of the multiplicity of images; and,
responsive to the matching of the frame to the annotated one of the multiplicity of the images, transmitting a message to at least one subscriber of the live instance of the corresponding live event indicating a likelihood of an impending future occurrence of the exciting moment which has not yet occurred at a time of transmitting the message and embedding in the message a hyperlink with a network address of the video streaming that responsive to an activation of the hyperlink causes a display of the video streaming; and,
computing a probability of a wager resulting in a payout based upon the exciting moment; and,
including in the message, an activatable control programmed to present a prompt in a mobile device of the subscriber to purchase a fractional interest in the wager.

11. The computer program product of claim 10, wherein the corresponding live event is a card game.

12. The computer program product of claim 10, wherein the corresponding live event is a sporting event.

13. The computer program product of claim 10, wherein the corresponding live event is an awards program.

14. The computer program product of claim 10, wherein the method further includes:
filtering a list of subscribers with respect to the corresponding live event; and,
transmitting the message only to those of the subscribers filtered according to the corresponding live event.

* * * * *